United States Patent
Hisada

(10) Patent No.: US 11,955,880 B2
(45) Date of Patent: Apr. 9, 2024

(54) OVERCURRENT PROTECTION CIRCUIT, POWER SUPPLY CONTROL DEVICE, INVERTING TYPE SWITCHING POWER SUPPLY

(71) Applicant: Rohm Co., Ltd., Kyoto (JP)

(72) Inventor: Tatsuya Hisada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 172 days.

(21) Appl. No.: 17/667,810

(22) Filed: Feb. 9, 2022

(65) Prior Publication Data

US 2022/0286042 A1    Sep. 8, 2022

(30) Foreign Application Priority Data

Mar. 8, 2021 (JP) .................... 2021-036015

(51) Int. Cl.
 *H02M 1/32* (2007.01)
 *H02M 3/158* (2006.01)
(52) U.S. Cl.
 CPC ............ *H02M 1/32* (2013.01); *H02M 3/158* (2013.01)

(58) Field of Classification Search
 CPC ................................ H02M 1/32; H02M 3/158
 See application file for complete search history.

(56) References Cited

U.S. PATENT DOCUMENTS

| 10,374,594 B2* | 8/2019 | Kaeriyama | H03K 17/0828 |
| 2012/0014025 A1* | 1/2012 | Sato | H04R 9/02 361/93.1 |
| 2016/0285403 A1* | 9/2016 | Masuda | H02P 29/027 |

FOREIGN PATENT DOCUMENTS

JP    2005-333691    12/2005

* cited by examiner

*Primary Examiner* — Rafael O Leon De Domenech
(74) *Attorney, Agent, or Firm* — Fish & Richardson P.C.

(57) ABSTRACT

An overcurrent protection circuit includes a low-pass filter configured to generate a smoothing voltage corresponding to a voltage across a lower transistor forming a half-bridge output stage of an inverting type switching power supply, wherein an overcurrent protection signal is generated based on the smoothing voltage.

9 Claims, 8 Drawing Sheets

OVERCURRENT PROTECTION CIRCUIT, POWER SUPPLY CONTROL DEVICE, INVERTING TYPE SWITCHING POWER SUPPLY

CROSS-REFERENCE TO RELATED APPLICATION

This application is based upon and claims the benefit of priority from Japanese Patent Application No. 2021-036015, filed on Mar. 8, 2021, the entire contents of which are incorporated herein by reference.

TECHNICAL FIELD

The present disclosure relates to an overcurrent protection circuit, a power supply control device using the same, and an inverting type switching power supply.

BACKGROUND

As one of safety mechanisms for protecting a power transistor and a load, an overcurrent protection circuit is incorporated in various applications (for example, an inverting type switching power supply).

However, a conventional overcurrent protection circuit has room for improvement in a current detection method.

SUMMARY

Some embodiments of the present disclosure provide an overcurrent protection circuit capable of limiting a load current value itself, a power supply control device using the same, and an inverting type switching power supply.

According to one embodiment of the present disclosure, there is provided an overcurrent protection circuit including a low-pass filter configured to generate a smoothing voltage corresponding to a voltage across a lower transistor forming a half-bridge output stage of an inverting type switching power supply, wherein an overcurrent protection signal is generated based on the smoothing voltage.

Other features, elements, steps, advantages, and features will become more apparent by the following embodiments for carrying out the present disclosure, and the accompanying drawings related thereto.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

<Inverting Type Switching Power Supply>

Figure 1:
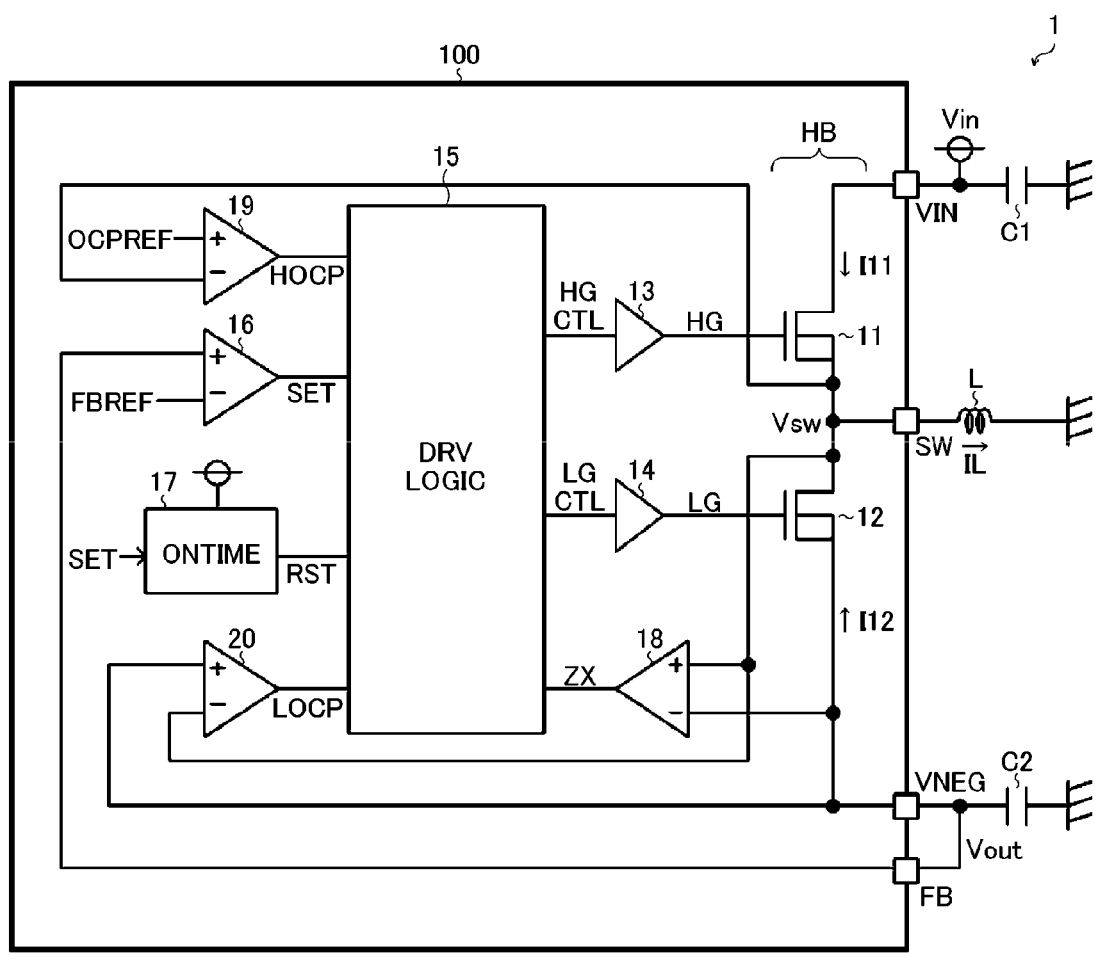
FIG. 1 is a diagram showing an overall configuration of an inverting type switching power supply.

FIG. 1 is a diagram showing an overall configuration of an inverting type switching power supply. An inverting type switching power supply 1 in FIG. 1 is a DC/DC converter that generates a negative output voltage Vout (<GND) from a positive input voltage Vin (>GND), and includes a power supply control device 100 and various discrete components (an inductor L and capacitors C1 and C2 in FIG. 1) externally attached to the power supply control device 100.

The power supply control device 100 is a semiconductor integrated circuit device (a so-called power supply control IC) which is a control main body of the inverting type switching power supply 1, and has a plurality of external terminals (in FIG. 1, a non-inverting input terminal VIN, a switch terminal SW, a negative output terminal VNEG, and a feedback terminal FB) as means for establishing electrical connection with the outside of the device.

Outside the power supply control device 100, the non-inverting input terminal VIN to which a positive input voltage Vin is applied is connected to a first end of the capacitor C1. The switch terminal SW to which a switch voltage Vsw having a rectangular waveform is applied is connected to a first end of the inductor L. Both the negative output terminal VNEG and the feedback terminal FB to which a negative output voltage Vout is applied are connected to a first end of the capacitor C2. All of a second end of the inductor L and second ends of the capacitors C1 and C2 are connected to a ground terminal (ground potential GND).

In FIG. 1, an example in which the output voltage Vout is directly input to the feedback terminal FB is given, but a divided voltage of the output voltage Vout may be input to the feedback terminal FB.

<Power Supply Control Device>

Subsequently, an internal configuration of the power supply control device 100 will be described with reference to FIG. 1. The power supply control device 100 of this configuration example includes an upper transistor 11, a lower transistor 12, an upper driver 13, a lower driver 14, a drive logic 15, a comparator 16, an on-time setting circuit 17, a backflow detection circuit 18, an upper overcurrent protection circuit 19, and a lower overcurrent protection circuit 20.

The upper transistor 11 is connected between the positive input terminal VIN and the switch terminal SW, and functions as an upper switch (an output transistor) that forms a half-bridge output stage HB of the inverting type switching power supply 1. The upper transistor 11 is turned on and off according to an upper gate signal HG input to a gate of the upper transistor 11. When an NMOSFET [N-channel type metal oxide semiconductor field effect transistor] is used as the upper transistor 11, the upper transistor 11 is turned on when the upper gate signal HG is at a high level, and is turned off when the upper gate signal HG is at a low level.

The lower transistor 12 is connected between the switch terminal SW and the negative output terminal VNEG, and functions as a lower switch (a synchronous rectification transistor) that forms the half-bridge output stage HB. The lower transistor 12 is turned on and off according to a lower gate signal LG input to a gate of the lower transistor 12. For example, when an NMOSFET is used as the lower transistor 12, the lower transistor 12 is turned on when the lower gate signal LG is at a high level, and is turned off when the lower gate signal LG is at a low level.

The upper driver 13 generates the upper gate signal HG according to an upper control signal HGCTL input from the drive logic 15.

The lower driver 14 generates the lower gate signal LG according to a lower control signal LGCTL input from the drive logic 15.

The drive logic 15 generates the upper control signal HGCTL and the lower control signal LGCTL according to a set signal SET input from the comparator 16 and a reset signal RST input from the on-time setting circuit 17.

Further, the drive logic 15 has a function of preventing a backflow of an inductor current IL toward the negative output terminal VNEG from the switch terminal SW via the lower transistor 12 by forcibly turning off the lower transistor 12 according to a backflow detection signal ZX input from the backflow detection circuit 18.

Further, the drive logic 15 also has a function of forcibly setting the half-bridge output stage HB to an output high impedance state (a state in which both the upper transistor 11 and the lower transistor 12 are turned off) according to an upper overcurrent protection signal HOCP input from the upper overcurrent protection circuit 19 and a lower overcurrent protection signal LOCP input from the lower overcurrent protection circuit 20.

The comparator 16 compares a feedback voltage (for example, the output voltage Vout) input from the feedback terminal FB to a non-inverting input terminal (+) of the comparator 16 with a reference voltage FBREF input to an inverting input terminal (−) of the comparator 16 to generate the set signal SET.

The on-time setting circuit 17 generates the reset signal RST for setting an on-time Ton of the upper transistor 11 in synchronization with the set signal SET (corresponding to the on-timing of the upper transistor 11).

A topology of an output feedback loop is not limited to the above-described one, and any control method such as voltage mode control, current mode control, or hysteresis control (ripple control) may be adopted.

The backflow detection circuit 18 monitors a voltage across the lower transistor 12 during an on-period of the lower transistor 12 to generate the backflow detection signal ZX. For example, the backflow detection signal ZX has a low level (a logical level when no backflow is detected) when the switch voltage Vsw is lower than the output voltage Vout, and has a high level (a logical level when a backflow is detected) when the switch voltage Vsw is higher than the output voltage Vout.

The upper overcurrent protection circuit 19 generates the upper overcurrent protection signal HOCP indicating whether or not an upper current I11 flowing through the upper transistor 11 is in an overcurrent state. For example, the upper overcurrent protection circuit 19 compares the switch voltage Vsw generated during an on-period of the upper transistor 11 with a predetermined overcurrent detection voltage OCPREF to generate the upper overcurrent protection signal HOCP.

The lower overcurrent protection circuit 20 generates the lower overcurrent protection signal LOCP indicating whether or not a lower current I12 flowing through the lower transistor 12 is in an overcurrent state. For example, the lower overcurrent protection circuit 20 monitors the voltage across the lower transistor 12 during the on-period of the lower transistor 12 to generate the lower overcurrent protection signal LOCP.

<Basic Operation>

Next, a basic operation of the inverting type switching power supply 1 will be briefly described. When the upper transistor 11 is turned on and the lower transistor 12 is turned off, the inductor current IL (the upper current I11) flows through a current path from the positive input terminal VIN to the ground terminal via the upper transistor 11, the switch terminal SW, and the inductor L. At this time, energy is stored in the inductor L.

Thereafter, when the upper transistor 11 is turned off and the lower transistor 12 is turned on, due to release of the energy stored in the inductor L, the inductor current IL (the lower current I12) continues to flow through a current path from the negative output terminal VNEG to the ground terminal via the lower transistor 12, the switch terminal SW, and the inductor L. At this time, the negative output voltage Vout lower than a voltage at the ground terminal (the ground potential GND) is generated at the negative output terminal VNEG.

Thereafter, by repeating turning on and off of the upper transistor 11 and the lower transistor 12, the negative output voltage Vout ($=-(\text{Ton}/\text{Toff}) \times \text{Vin}$, where Ton and Toff are an on-time and an off-time of the upper transistor 11, respectively) can be generated from the positive input voltage Vin.

<Consideration on Overcurrent Detection>

In the inverting type switching power supply 1, an upper peak value and a lower peak value of the inductor current IL are limited by the functions of the upper overcurrent protection circuit 19 and the lower overcurrent protection circuit 20, respectively. However, there is a desire in the market to limit a load current value Iload (corresponding to an average value of the inductor current IL) itself. However, when a sense resistor is inserted in a current path to the load (for example, after the inductor L), load regulation of the output voltage Vout may deteriorate. Hereinafter, a novel overcurrent protection circuit that can solve the above problem will be suggested.

Overcurrent Protection Circuit (First Embodiment)

Figure 2:
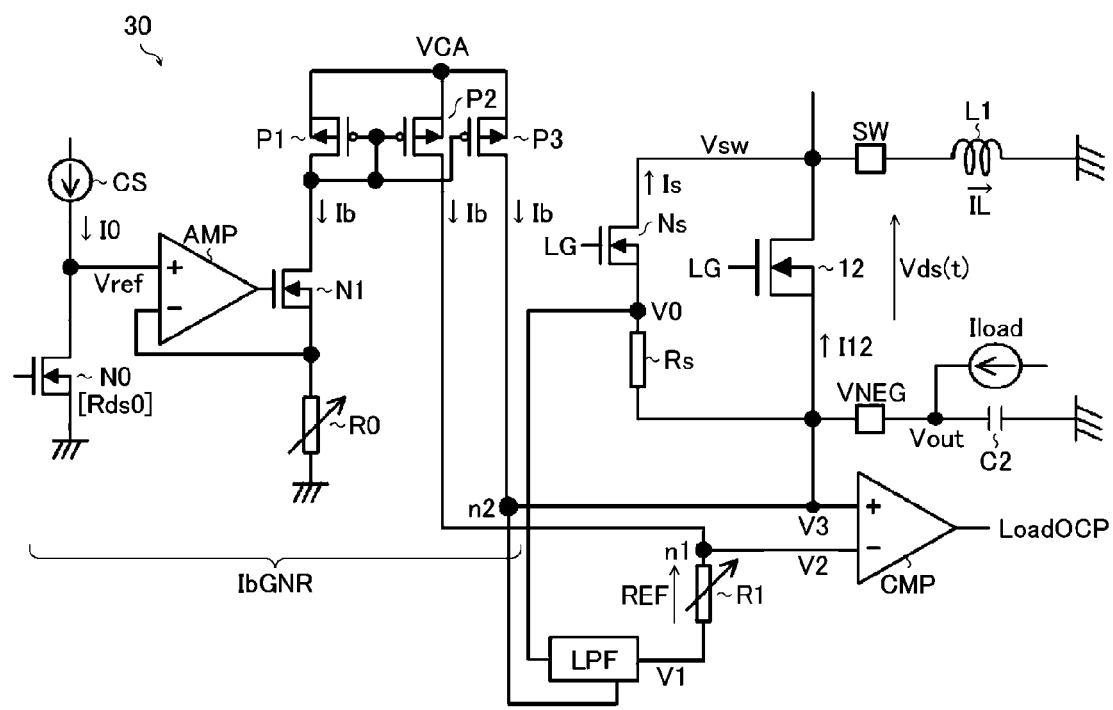
FIG. 2 is a diagram showing an overcurrent protection circuit according to a first embodiment.

FIG. 2 is a diagram showing an overcurrent protection circuit 30 according to a first embodiment. The overcurrent protection circuit 30 of the present embodiment replaces the lower overcurrent protection circuit 20 of FIG. 1, and includes transistors N0 and N1 (both NMOSFETs), a sense transistor Ns (NMOSFET), transistors P1 to P3 (all PMOSFETs [P-channel type MOSFETs]), resistors R0 and R1, a sense resistor Rs, a current source CS, an operational amplifier AMP, a comparator CMP, and a low-pass filter LPF.

The current source CS supplies a reference current I0 toward a drain of the transistor N0. The transistor N0 (on resistance: Rds0) is continuously turned on during an operation of the overcurrent protection circuit 30, and functions as a reference resistor for converting the reference current I0 into a reference voltage Vref ($=\text{I0} \times \text{Rds0}$). It is desirable that the transistor N0 be integrated by a process common to the lower transistor 12 so as to have the same temperature characteristics as the lower transistor 12. With this configuration, the current source CS and the transistor N0 function as a reference voltage generator configured to generate the reference voltage Vref by flowing the reference current I0 through the reference resistor (the transistor N0).

A non-inverting input terminal (+) of the operational amplifier AMP is connected to the drain of the transistor N0 (an application terminal of the reference voltage Vref). An inverting input terminal (−) of the operational amplifier AMP is connected to a source of the transistor N1. An output terminal of the operational amplifier AMP is connected to a gate of the transistor N1. The source of the transistor N1 is connected to a first end of the resistor R0. A second end of the resistor R0 is connected to the ground terminal. The resistor R0 may have a resistance value adjusting function (trimming function).

The operational amplifier AMP drives the gate of the transistor N1 so that the non-inverting input terminal (+) and the inverting input terminal (−) of the operational amplifier AMP are imaginarily short-circuited. As a result, a bias current Ib (=Vref/R0=I0×Rds0/R0) corresponding to the reference voltage Vref flows through the resistor R0. As described above, the operational amplifier AMP, the transistor N1, and the resistor R0 function as a voltage/current converter configured to convert the reference voltage Vref into the bias current Ib.

Sources of the transistors P1 to P3 are all connected to an application terminal of a power supply voltage VCA. Gates of the transistors P1 to P3 are all connected to a drain of the transistor P1. The drain of the transistor P1 is connected to the drain of the transistor N1. A drain of the transistor P2 is connected to a node n1. A drain of the transistor P3 is connected to a node n2. The transistors P1 to P3 connected as described above function as a current mirror configured to supply the bias current Ib flowing through the transistor N1 to each of the nodes n1 and n2.

Further, the above-described reference voltage generator (CS and N0), voltage/current converter (AMP, N1, and R0), and current mirror (P1 to P3) can be understood as constituent elements of a bias current generation circuit IbGNR configured to supply the bias current Ib to each of the nodes n1 and n2.

A drain of the sense transistor Ns is connected to a drain of the lower transistor 12 (that is, the switch terminal SW). A source of the sense transistor Ns is connected to a first end of the sense resistor Rs. A second end of the sense resistor Rs is connected to a source of the lower transistor 12 (that is, the negative output terminal VNEG). As described above, the sense transistor Ns and the sense resistor Rs are connected in series between the drain and source of the lower transistor 12.

The lower gate signal LG is input to a gate of the sense transistor Ns, and the sense transistor Ns is turned on and off in synchronization with the lower transistor 12. Accordingly, during the on-period of the lower transistor 12, when the lower current I12 flows through the lower transistor 12, the sense transistor Ns is also turned on, so that a sense current Is flows through the sense transistor Ns.

Here, a magnitude of the sense current Is is determined by a ratio of a resistance value of the sense resistor Rs and an on-resistance value of each of the sense transistor Ns and the lower transistor 12.

The low-pass filter LPF generates a smoothing voltage V1 corresponding to a voltage across the lower transistor 12 (a voltage Vds(t) between the drain and source of the lower transistor 12). Referring to FIG. 2, the low-pass filter LPF generates the smoothing voltage V1 (=∫V0dt) by smoothing a node voltage V0 (≈Nout−Vds(0)) that appears at a connection node between the sense transistor Ns and the sense resistor Rs.

Figure 3:
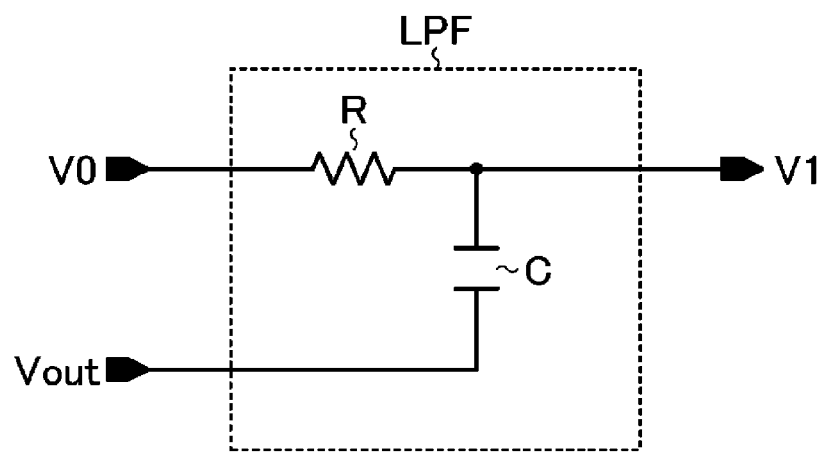
FIG. 3 is a diagram showing a configuration example of a low-pass filter.

FIG. 3 is a diagram showing a configuration example of the low-pass filter LPF. The low-pass filter LPF of this configuration example includes a resistor R and a capacitor C. A first end of the resistor R is connected to an application terminal of the node voltage V0. Both a second end of the resistor R and a first end of the capacitor C are connected to an application terminal of the smoothing voltage V1. A second end of the capacitor C is connected to an application terminal (the negative output terminal VNEG) of the output voltage Vout. As described above, a general RC filter can be used as the low-pass filter LPF.

Returning to FIG. 2, the description of the overcurrent protection circuit 30 is continued. A first end of the resistor R1 is connected to the node n1. A second end of the resistor R1 is connected to an output terminal (the application terminal of the smoothing voltage V1) of the low-pass filter LPF. Therefore, a node voltage V2 (=V1+REF) obtained by adding a predetermined reference voltage REF (=Ib× R1=I0×Rds0×R1/R0) to the smoothing voltage V1 appears at the node n1. The resistor R1 may have a resistance value adjusting function (trimming function). Further, the node n2 is connected to the application terminal (the negative output terminal VNEG) of the output voltage Vout.

The comparator CMP compares the node voltage V2 input from the node n1 to an inverting input terminal (−) of the comparator CMP with a node voltage V3 input from the node n2 to a non-inverting input terminal (+) of the comparator CMP to generate an overcurrent protection signal LoadOCP.

Figure 4:
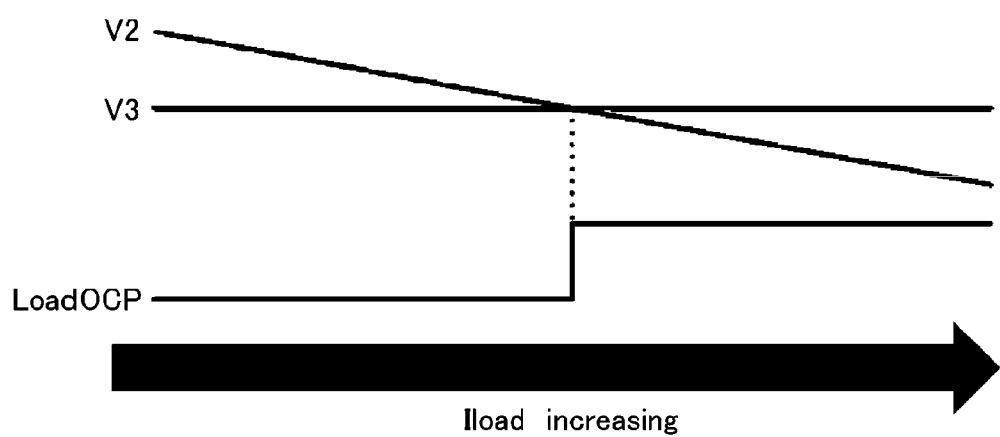
FIG. 4 is a diagram showing an operation of generating an overcurrent protection signal.

FIG. 4 is a diagram showing an operation of generating the overcurrent protection signal LoadOCP, and depicts the node voltages V2 and V3 and the overcurrent protection signal LoadOCP in this order from the top. As shown in FIG. 4, the overcurrent protection signal LoadOCP has a low level (a logical level when no overcurrent is detected) when V2>V3, and has a high level (a logical level when an overcurrent is detected) when V2<V3. The node voltage V2 becomes lower as the load current Iload increases.

Figure 5:
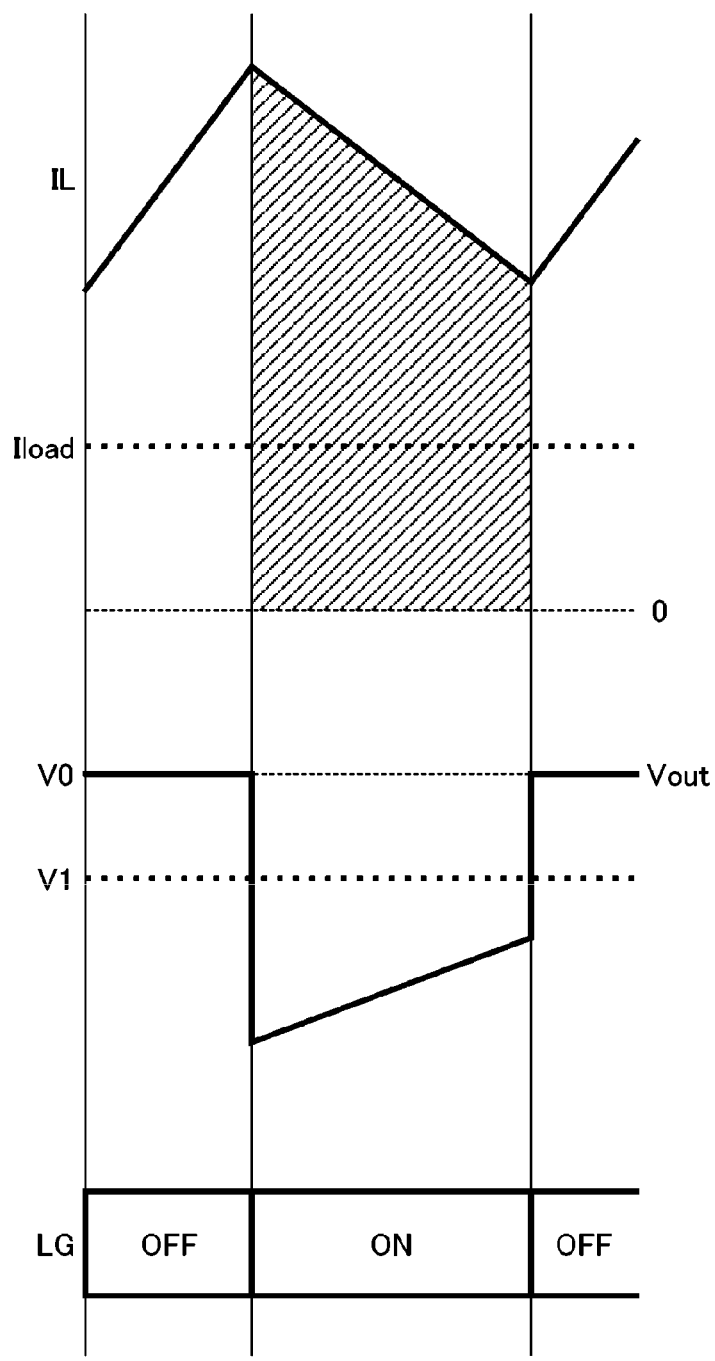
FIG. 5 is a diagram showing an ideal load current detection operation in the first embodiment.

FIG. 5 is a diagram showing an ideal load current detection operation in the first embodiment, and depicts the inductor current IL (solid line), the load current value Iload (broken line), the node voltage V0 (solid line), the smoothing voltage V1 (broken line), and the logical state (on and off) of the lower gate signal LG in this order from the top of the paper. In FIG. 5, the horizontal axis represents time, and the vertical axis represents a current value and a voltage value.

As shown in FIG. 5, a voltage value of the smoothing voltage V1 obtained by smoothing (integrating) the node voltage V0 having both duty information of the lower transistor 12 and current value information of the lower current I12 is equivalent to the load current value Iload. Accordingly, by generating the overcurrent protection signal LoadOCP based on the smoothing voltage V1, it is possible to limit the load current value Iload itself instead of a peak value of the inductor current IL.

Figure 6:
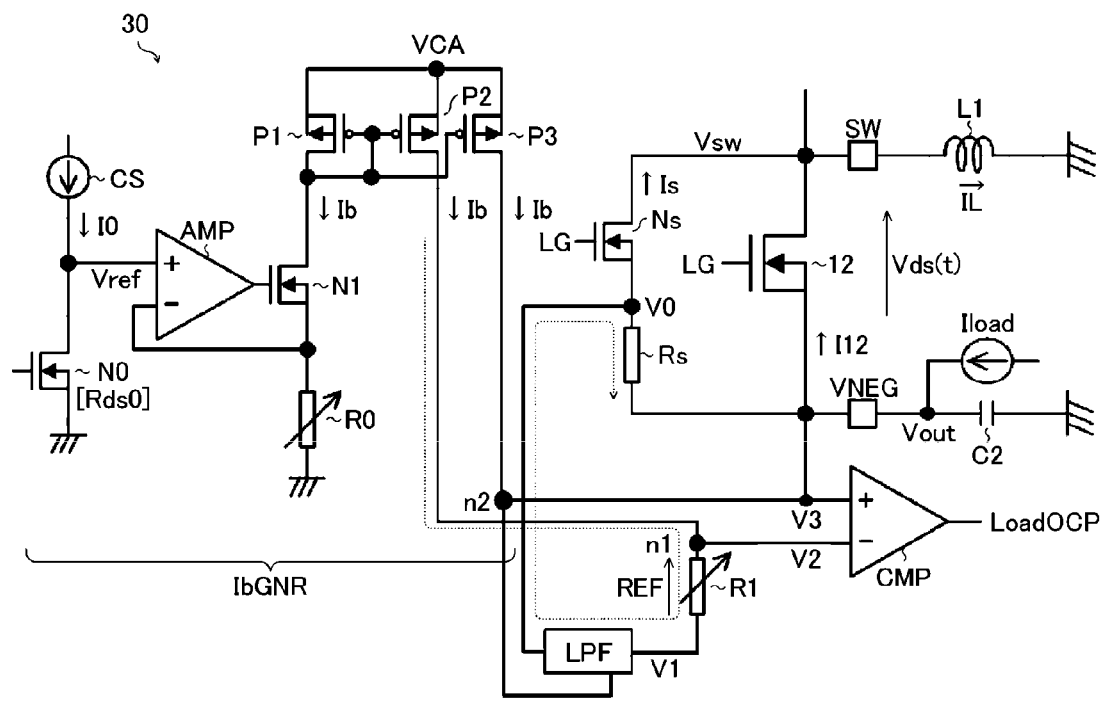
FIG. 6 is a diagram showing a state in which a bias current flows through a sense resistor.

FIG. 6 is a diagram showing a state in which the bias current Ib flows through the sense resistor Rs. In FIG. 5 described above, the ideal load current detection operation is described on the premise that the sense current Is does not flow through the sense resistor Rs. However, in reality, the bias current Ib flows through the sense resistor Rs via a path indicated by a broken line in FIG. 6. Therefore, an unintended offset occurs in the node voltage V0.

Figure 7:
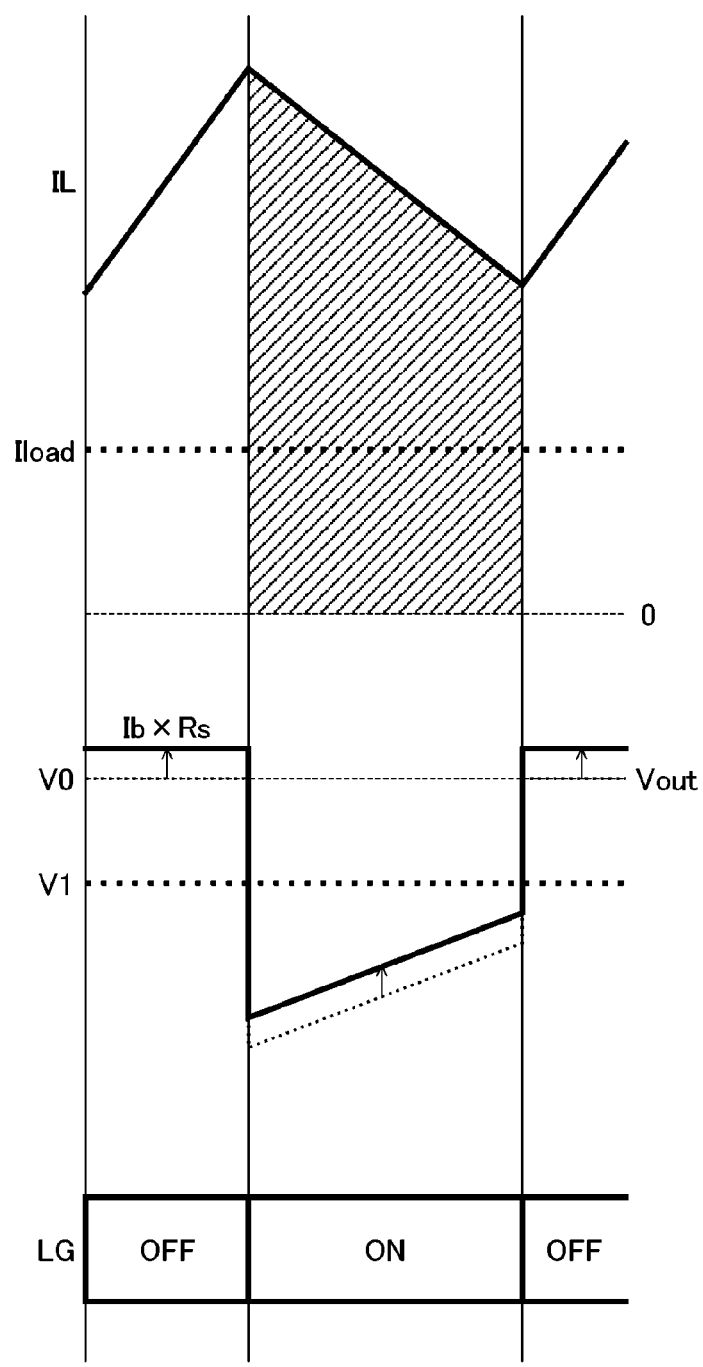
FIG. 7 is a diagram showing a realistic load current detection operation in the first embodiment.

FIG. 7 is a diagram showing a realistic load current detection operation in the first embodiment, and in the same manner as in FIG. 5 above, depicts the inductor current IL (solid line), the load current value Iload (broken line), the node voltage V0 (solid line), the smoothing voltage V1 (broken line), and the logical state (on/off) of the lower gate signal LG in this order from the top of the paper.

As shown in FIG. 7, when the bias current Ib flows through the sense resistor Rs, the node voltage V0 becomes higher than what the voltage value is supposed to be. Specifically, when the lower transistor 12 is turned off, although V0 should originally be Vout, V0 becomes Vout+ Ib×Rs. Further, when the lower transistor 12 is turned on, although V0 should originally be Vout−I12×Rs, V0 becomes Vout−I12×Rs+Ib×Rs.

As a result, there is a concern that even when the load current value Iload exceeds the original upper limit value, the overcurrent protection signal LoadOCP does not rise to a high level and overcurrent protection is delayed. Hereinafter, a second embodiment capable of solving such a problem is proposed.

Overcurrent Protection Circuit (Second Embodiment)

Figure 8:
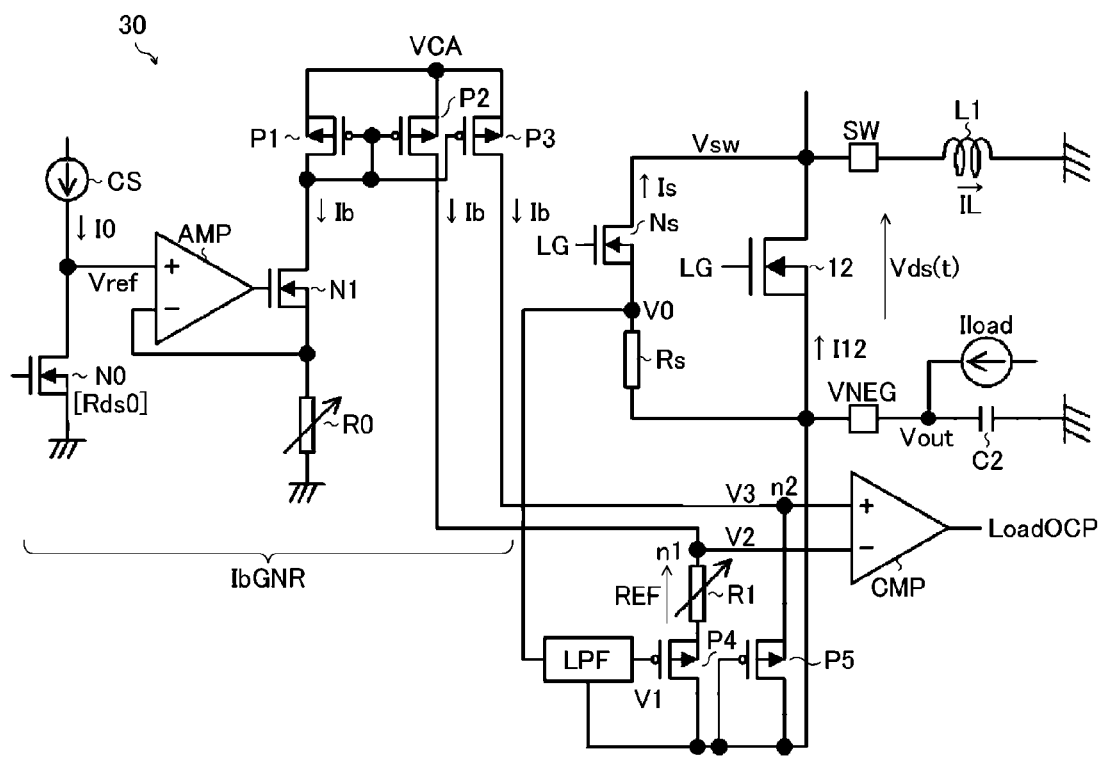
FIG. 8 is a diagram showing an overcurrent protection circuit according to a second embodiment.

FIG. 8 is a diagram showing an overcurrent protection circuit 30 according to a second embodiment. The overcurrent protection circuit 30 of the present embodiment is based on the above-described first embodiment (see FIG. 2), and further includes transistors P4 to P5 (both PMOSFETs). Therefore, the constituent elements already mentioned are denoted by the same reference numerals as those in FIG. 2 so that explanation thereof will not be repeated, and feature portions of the present embodiment will be mainly described below.

As in the first embodiment (see FIG. 2), the first end of the resistor R1 is connected to the node n1. A source of the transistor P4 is connected to the second end of the resistor R1. A gate of the transistor P4 is connected to the output terminal (the application terminal of the smoothing voltage V1) of the low-pass filter LPF. A source of the transistor P5 is connected to the node n2. A drain of the transistor P4 and a drain and gate of the transistor P5 are all connected to the application terminal (the negative output terminal VNEG) of the output voltage V out.

As described above, the overcurrent protection circuit 30 of the present embodiment includes the transistor P4 connected between the node n1 and the source of the lower transistor 12 so that the smoothing voltage V1 is input to the gate, the transistor P5 connected between the node n2 and the drain of the lower transistor 12 so that the drain of the lower transistor 12 is connected to the gate, and the resistor R1 connected in series with the transistor P4 between the node n1 and the drain of the lower transistor 12.

That is, the overcurrent protection circuit 30 of the present embodiment has a configuration in which the output terminal of the low-pass filter LPF is connected to the gate of the transistor P4 instead of the second end of the resistor R1, in other words, a configuration in which the smoothing voltage V1 is received at the gate of the transistor P4 having a high input impedance. With such a configuration, since a current path through which the bias current Ib flows can be separated from the sense resistor Rs, an unnecessary offset is not generated in the node voltage V0.

In the overcurrent protection circuit 30 of the present embodiment, the node voltages V2 and V3 input to the comparator CMP can be represented by V2=V1+Vth(P4)+ REF and V3=Vout+Vth(P5) (where Vth(P4) and Vth(P5) are on-threshold voltages of the transistors P4 and P5, respectively), respectively.

Accordingly, in order to improve the overcurrent detection accuracy, it is desirable that the transistors P4 and P5 be integrated by a common process so that the transistors P4 and P5 have the same on-threshold voltages Vth(P4) and Vth(P5).

Figure 9:
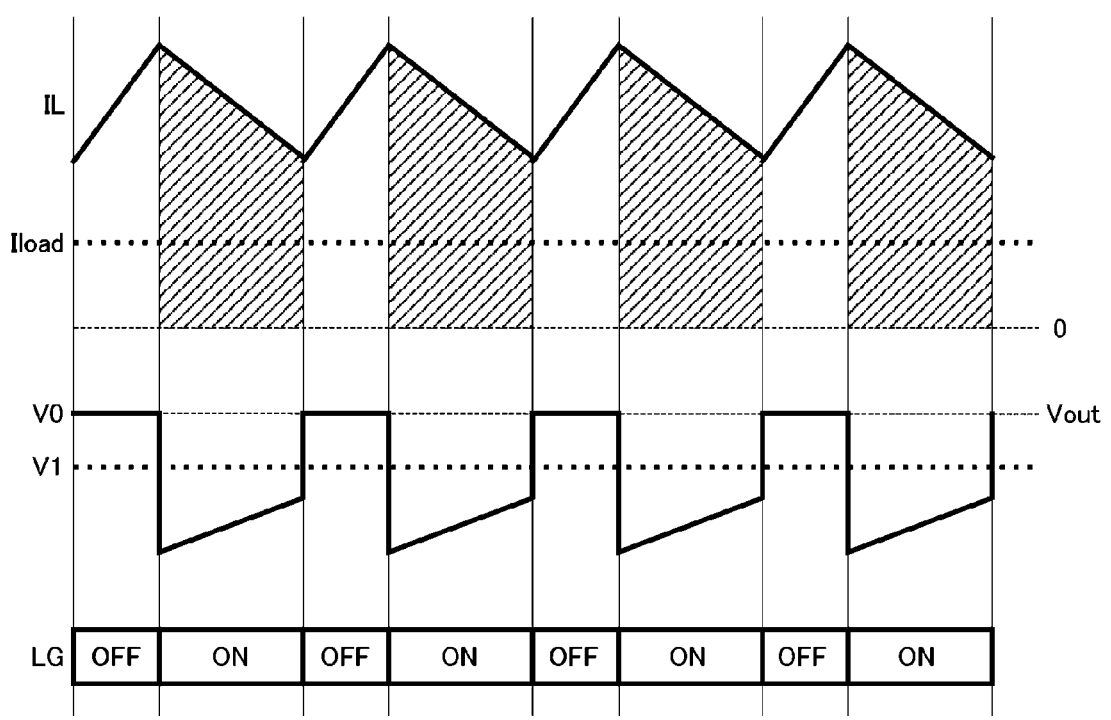
FIG. 9 is a diagram showing a load current detection operation in the second embodiment.

FIG. 9 is a diagram showing a load current detection operation in the second embodiment, and in the same manner as described in FIGS. 5 and 7 above, the inductor current IL (solid line), the load current value Iload (broken line), the node voltage V0 (solid line), the smoothing voltage V1 (broken line), and the logical state (on and off) of the lower gate signal LG are depicted in this order from the top of the paper.

As shown in FIG. 9, in the overcurrent protection circuit 30 of the present embodiment, since the bias current Ib does not flow in the sense resistor Rs, an unnecessary offset is not attached to the node voltage V0. Specifically, when the lower transistor 12 is turned off, V0 becomes Vout, and when the lower transistor 12 is turned on, V0 becomes Vout−I12× Rs.

As a result, since the overcurrent protection signal LoadOCP can be raised to a high level without delay at the time point when the load current value Iload exceeds the original upper limit value, overcurrent protection can be appropriately applied.

Focusing on load protection, it is sufficient to limit the load current value Iload itself by using the overcurrent protection circuit 30, and it is not always necessary to provide the upper overcurrent protection circuit 19. On the other hand, from the viewpoint of protecting the power supply control device 100, it is desirable to leave the above-mentioned upper overcurrent protection circuit 19 as a means for limiting the upper current I11 which may flow excessively at the time of ground fault of the switch terminal SW.

SUMMARY

The various embodiments described above will be summarized below.

For example, an overcurrent protection circuit disclosed in the present disclosure includes a low-pass filter configured to generate a smoothing voltage corresponding to a voltage across a lower transistor forming a half-bridge output stage of an inverting type switching power supply, wherein an overcurrent protection signal is generated based on the smoothing voltage (first configuration).

The overcurrent protection circuit of the first configuration may further include a sense transistor and a sense resistor, wherein a first end of the sense transistor is connected to a first end of the lower transistor, and the sense transistor is turned on and off in synchronization with the lower transistor, wherein the sense resistor is connected between a second end of the sense transistor and a second end of the lower transistor, and wherein the low-pass filter generates the smoothing voltage by smoothing a node voltage appearing at a connection node between the sense transistor and the sense resistor (second configuration).

The overcurrent protection circuit of the second configuration may further include a first node, a second node, a bias current generation circuit configured to supply a bias current to each of the first node and the second node, a first transistor connected between the first node and the second end of the lower transistor and having a gate to which the smoothing voltage is input, a second transistor connected between the second node and the second end of the lower transistor and having a gate connected to the second end of the lower transistor, a resistor connected in series with the first transistor between the first node and the second end of the lower transistor, and a comparator configured to compare a first node voltage appearing at the first node and a second node voltage appearing at the second node to generate the overcurrent protection signal (third configuration).

In the overcurrent protection circuit of the third configuration, the first transistor and the second transistor may have the same on-threshold voltage (fourth configuration).

In the overcurrent protection circuit of the third or fourth configuration, the bias current generation circuit may include a reference voltage generator configured to generate a reference voltage by flowing a reference current through a reference resistor, a voltage/current converter configured to convert the reference voltage into the bias current, and a current mirror configured to supply the bias current to each of the first node and the second node (fifth configuration).

In the overcurrent protection circuit of the fifth configuration, the reference resistor may be an on-resistor of a transistor configured to have the same temperature characteristics as the lower transistor (sixth configuration).

In the overcurrent protection circuit of any one of the second to sixth configurations, a current capacity of the sense transistor may be smaller than a current capacity of the lower transistor (seventh configuration).

In the overcurrent protection circuit of any one of the first to seventh configurations, the low-pass filter may be an RC filter including a resistor and a capacitor (eighth configuration).

Further, for example, a power supply control device disclosed in the present disclosure includes the overcurrent protection circuit of any one of the first to eighth configurations (ninth configuration).

Further, for example, an inverting type switching power supply disclosed in the present disclosure includes the power supply control device of the ninth configuration (tenth configuration).

OTHER MODIFICATIONS

In addition to the above-described embodiments, various technical features disclosed in the present disclosure can be modified in various ways without departing from the gist of the technical creation. For example, mutual replacement between a bipolar transistor and a MOS field effect transistor and logical level inversion of various signals are arbitrary. That is, it should be considered that the above-described embodiments are exemplary in all respects, not restrictive, and the technical scope of the present disclosure is not limited to the above-described embodiments. It should be understood that the technical scope of the present disclosure encompasses all changes belonging to the meaning and scope equivalent to the claims.

According to the present disclosure in some embodiments, it is possible to provide an overcurrent protection circuit capable of limiting a load current value itself, a power supply control device using the same, and an inverting type switching power supply.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An overcurrent protection circuit comprising:
   a low-pass filter configured to generate a smoothing voltage corresponding to a voltage across a lower transistor forming a half-bridge output stage of an inverting type switching power supply;
   a sense transistor; and
   a sense resistor,
   wherein an overcurrent protection signal is generated based on the smoothing voltage,
   wherein a first end of the sense transistor is connected to a first end of the lower transistor, and the sense transistor is turned on and off in synchronization with the lower transistor,
   wherein the sense resistor is connected between a second end of the sense transistor and a second end of the lower transistor, and
   wherein the low-pass filter generates the smoothing voltage by smoothing a node voltage appearing at a connection node between the sense transistor and the sense resistor.

2. The overcurrent protection circuit of claim 1, further comprising:
   a first node;
   a second node;
   a bias current generation circuit configured to supply a bias current to each of the first node and the second node;
   a first transistor connected between the first node and the second end of the lower transistor and having a gate to which the smoothing voltage is input;
   a second transistor connected between the second node and the second end of the lower transistor and having a gate connected to the second end of the lower transistor;
   a resistor connected in series with the first transistor between the first node and the second end of the lower transistor; and
   a comparator configured to compare a first node voltage appearing at the first node and a second node voltage appearing at the second node to generate the overcurrent protection signal.

3. The overcurrent protection circuit of claim 2, wherein the first transistor and the second transistor have the same on-threshold voltage.

4. The overcurrent protection circuit of claim 2, wherein the bias current generation circuit includes:
   a reference voltage generator configured to generate a reference voltage by flowing a reference current through a reference resistor;
   a voltage/current converter configured to convert the reference voltage into the bias current; and
   a current mirror configured to supply the bias current to each of the first node and the second node.

5. The overcurrent protection circuit of claim 4, wherein the reference resistor is an on-resistor of a transistor configured to have the same temperature characteristics as the lower transistor.

6. The overcurrent protection circuit of claim 1, wherein a current capacity of the sense transistor is smaller than a current capacity of the lower transistor.

7. The overcurrent protection circuit of claim 1, wherein the low-pass filter is an RC filter including a resistor and a capacitor.

8. A power supply control device comprising the overcurrent protection circuit of claim 1.

9. An inverting type switching power supply comprising the power supply control device of claim 8.

* * * * *